US005558923A

United States Patent [19]

Vesamaa

[11] Patent Number: 5,558,923

[45] Date of Patent: Sep. 24, 1996

[54] PACKAGE PADDING MATERIAL AND APPARATUS FOR FORMING PACKAGE PADDING MATERIAL

[75] Inventor: Jussi Vesamaa, Raisio, Finland

[73] Assignee: Mercamer Oy, Vantaa, Finland

[21] Appl. No.: 326,463

[22] Filed: Oct. 20, 1994

[30] Foreign Application Priority Data

Oct. 27, 1993 [FI] Finland .................................... 934765

[51] Int. Cl.[6] ................................ D06N 7/04; B32B 3/00

[52] U.S. Cl. ........................... 428/154; 428/34.2; 428/78; 428/137; 428/141; 428/155; 428/172; 428/178; 428/181; 428/184; 428/192; 428/534; 428/537.5; 493/346; 493/352; 493/967; 428/218; 428/219

[58] Field of Search .................................... 428/184, 182, 428/155, 154, 178, 218, 219, 141, 84, 137, 34.2, 78, 172, 181, 192, 534, 537.5; 493/346, 352, 967; 162/280

[56] References Cited

U.S. PATENT DOCUMENTS 2,045,733 6/1936 Spafford .................................. 428/184
3,017,317 1/1962 Voytman et al. ........................ 428/154
3,047,445 7/1962 Gresham ................................. 428/154
5,203,761 4/1994 Reichental et al. ..................... 493/346

*Primary Examiner*—Donald J. Loney
*Attorney, Agent, or Firm*—Merchant, Gould, Smith, Edell, Welter & Schmidt, P.A.

[57] ABSTRACT

The invention concerns a package padding and an apparatus for forming same. The package padding is continuous and web-like and formed of superimposed paper courses (1,2,3). On the substantial surface area of one paper course (2) has with a pair of shaping rolls (16,17) been embossed a cellular padding structure. The package padding comprises a punch joint region (5) formed with the aid of a pair of punch joint rolls (18,19), and an intact area (7) substantially free of punchings, the package padding being more bulky and fluffy in the region thereof than in the punch joint region (5). In the embossed paper course (2) have by means of the speed differential of the punching rolls (18,19) and the shaping rolls (16,17) been folded pleats (8) so that the package padding contains per unit length of the package padding a greater length of paper material of the second paper course (2) than of paper material of the first paper course (1).

18 Claims, 8 Drawing Sheets

PACKAGE PADDING MATERIAL AND APPARATUS FOR FORMING PACKAGE PADDING MATERIAL

BACKGROUND OF THE INVENTION

The present invention concerns package padding material as defined in the preamble to claim 1. The invention further concerns an apparatus, defined in the preamble to Claim 11, for forming package padding material.

In prior art e.g. through the reference U.S. Pat. No. 5,203,761 an apparatus is known which has been arranged to form paper into continuous and web-like package padding material which comprises superimposed paper courses. The paper courses present a continuous series of successive and side-by-side eminences embossed in the paper courses. This serves the purpose of endowing the package padding with a cellular padding structure, and thus it increases the bulk of the paper web substantially. In the apparatus of the reference all paper course webs are run superimposed through between shaping rolls, the paper courses thus being pressed between said shaping rolls, whereby a cellular relief pattern is produced in them. Hereafter, the paper courses are separated and conducted by mutually different paths to combining rolls so that the eminences in the paper courses will be offset relative to each other so that they are no longer in register when they are once more superimposed, whereby a multiply cellular structure is obtained. The combining rolls are not arranged to break up the structure of the package padding web.

The problem with the apparatus and package padding known in the art is that, in practice, the individual paper courses of the paper padding tend to become detached from each other, and this will substantially impair the usability of the package padding and retention of its fluffiness. This is because keeping the package padding of prior art as a fluffy, padding structure would imply that in no situation whatsoever the paper courses would become mutually displaced into a relative position in which they were together pressed and in which the eminences and depressions of the paper courses are in register and will settle one into the other.

The previously known package padding and apparatus are further embarrassed by the problem that all paper courses are passed through the same pairs of rolls, as a result of which the structure of the package padding is similar throughout over the whole of its area, and this for instance hampers any attempts to fold the paper padding double. Detachment of the paper courses from each other is specifically the particular problem encountered when folding the material.

The apparatus known in the art moreover poses the problem that the paper courses are taken from one single paper roll on which several courses of paper webs have been wound, superimposed in special manner. The drawback here is that the operator cannot freely select any paper roll which he may desire to use in the machine.

A further problem associated with the apparatus known in the art and with paper padding therewith produced is that in practice the package padding is highly susceptible to flattening on being pressed, losing its padding property.

SUMMARY OF THE INVENTION

The object of the invention is to eliminate the drawbacks mentioned.

The object of the invention is specifically to disclose a package padding and an apparatus for forming such package padding which afford good mutual adherence of the superimposed paper courses as well as good permanence of their padding fluffiness even when the package padding is under compressive load and/or folded.

Furthermore, the object of the invention is to disclose an apparatus which is simple and reliable and enables a plurality of different papers to be used in forming a web-like package padding by taking paper from separate paper rolls.

The package padding of the invention is characterized by that which has been stated in claim 1. The apparatus of the invention is characterized by that which is stated in claim 11.

In the package padding of the invention, which is continuous and web-like and formed of superimposed paper course, and which comprises a first paper course and a second paper course, and at least on a substantial part of the total area of the second paper course has been embossed a continuous series of successive and side-by-side eminences to give the package padding a cellular padding structure.

As taught by the invention, the package padding comprises a punch joint region, on the area of which the first paper course and second paper course are joined together with a continuous series of punchings which constitute punch joints. The package padding furthermore comprises an intact region substantially free of punchings, the package padding being more bulky and fluffy on the area of this region than in the punch joint region. The second paper course comprises a continuous series of successive accordeon-like pleats transversal to the longitudinal direction of the web so that the package padding contains, per unit length of the package padding, a greater length of paper material of the second paper course than of the first paper course.

The invention affords the advantage that the paper courses comprised in the package padding hold together, thanks to the punch joining, better than in any previously known package padding, and also that the paper courses will not become detached from each other even when the package padding is folded. The invention furthermore affords the advantage that the package padding is easy to fold because the boundary line between the punch joint region and the intact region free from punchings constitutes a natural folding line along which the package padding is easy to fold. Convenient foldability of the package padding is also important, since it is then possible of the web-like package padding to shape thicker, fluffy protective pads, which may be placed between the package wall and the goods. Smallish pieces of goods will be well protected when they are wrapped in package padding which has been folded double or multiple. The pleating of the second paper course adds significantly to the bulk of the package padding and to its padding properties.

In an embodiment of the package padding the package padding comprises a third paper course, which is substantially similar to the first paper course. The first, second and third paper courses are arranged to be mutually superimposed so that the first paper course and third paper course are face layers of the package padding and the second paper course is a middle layer between said face layers. The first, second and third paper courses are also joined to each other with said punchings. By providing a tri-ply package padding, the shaped and pleated middle paper is protected with the face papers, and all have been joined together with punch joints. It is thus understood that the face papers are unshaped and substantially smooth in their intact area.

In an embodiment of the package padding the package padding comprises two punch joint regions, disposed on the margins of the package padding web. The intact region is the area between punch joint regions. In an embodiment, the widths of each region in the direction across the web are substantially equal, whereby the package padding can be folded triple by folding the punch joint regions over the central intact region.

In an embodiment of the package padding, the first and/or third paper course comprises an embossed pattern, located in the punch joint region. The members in the apparatus which perform the punching may at the same time also emboss and shape all papers.

In an embodiment of the package padding, the tongue which has been broken out by pressing from one paper course at the sites of the punchings joining together the different paper courses in the punch joint region has been pressed through the other paper courses so that the margin of said tongue clings to the edges of the aperture which has been formed in the second paper course.

In an embodiment of the package padding, the paper materials used to make up the paper courses are similar. Alternatively, the paper courses may equally be different.

In an embodiment of the package padding, the package padding comprises a kraft paper course having weight per unit area on the order of 50 to 100 g/m$^2$.

In an embodiment of the package padding, the package padding comprises a paper course which consists of anti-corrosion paper.

In an embodiment of the package padding, the eminences constituting the embossed pattern of the second paper course may comprise pleats serving to lend rigidity to said eminences.

As taught by the invention, the apparatus comprises a power means and a pair of cooperating shaping rolls provided with a plurality of shaping members and operating as a roll and counterroll pair, at least one of them being driven by the power means, and the second paper course web being conducted through between them for embossing.

As taught by the invention, the apparatus comprises a pair of cooperating punch joint rolls driven by the power means and operating as a roll and counter roll pair, disposed at a distance from the shaping rolls and downstream relative to the direction of travel of the paper web from the shaping rolls, and said punch joint rolls comprising a first punch joint roll provided with punching members, a second punch joint roll the punching members and countermembers are arranged in cooperation with each other to produce in the first and second paper course webs passing through between the punch joint rolls a continuous series of punchings for joining the paper course webs together. The first paper course web is guided to run through between the punch joint rolls only without passing through between the shaping rolls, and on the punch joint rolls have been provided regions free of punching members and countermembers, respectively, for producing on the package padding web an intact region free of punchings. The peripheral velocity of the shaping rolls is slightly higher than that of the punch joint rolls, whereby accordeon-like pleating of the second paper course web is achieved so that in the package padding is crammed, per unit length of the package padding, a greater length of the second than of the first paper course web.

In an embodiment of the apparatus, the apparatus comprises a first paper roll containing a supply of first paper web for the first paper course of the package padding and comprising a first guide member for guiding the first paper web from the first paper roll to the punch joint rolls; a second paper roll containing a supply of second paper web for the second paper course of the package padding and comprising a second guide member for guiding the second paper web from the second paper roll to the shaping rolls.

In an embodiment of the apparatus, the apparatus comprises a third paper roll containing a supply of third paper web for the third paper course of the package padding and comprising a third guide member for guiding the third paper web from the third paper roll to the punch joint rolls upon the second paper web, on the opposite side in relation to the first paper web so that the second paper web will become the middle layer between the first paper web layer and the third paper web layer.

In an embodiment of the apparatus, the punching members and countermembers are disposed in the region of both ends of the punch joint rolls for forming punch joints on the margins of the package padding, and the regions free of punching members and countermembers are located about the middle of the punch joint rolls in order to leave an intact region free of punchings in the area of the package padding between two punch joint regions.

In an embodiment of the apparatus, the punching members and countermembers are disposed to form an embossed pattern in the punch joint region of the package padding.

In an embodiment of the apparatus, the punching members are punching projections or equivalent disposed on the periphery of the first punch joint roll, and the countermembers are depressions or equivalent disposed on the periphery of the second punch joint roll. The projections and depressions are arranged to be in register, each depression being disposed to receive a projection in itself.

In an embodiment of the apparatus, the projections of the punching members are teeth, arranged in a sprocket wheel-resembling serration on the periphery of the first punch joint roll. The countermembers have been formed of sprocket chains, such as pin chains, bush chains, or equivalent, which have been wound to form endless loops around the second punch joint roll and have been affixed thereto.

In an embodiment of the apparatus, the shaping members are shaping projections, arranged radially on the periphery of both shaping rolls to constitute a plurality of tooth-like or sprocket wheel-like groups of projections, which have been disposed with regular spacing successively, substantially over the whole length of the shaping roll. The groups of projections on mutually opposed shaping rolls are disposed in intercalation with each other, and the distance between the shaping rolls is at every point substantially greater than the thickness of the individual paper web in order to effect in the paper web permanent deformations, such as distensions, pleats, etc., without substantially causing its breakage.

BRIEF DESCRIPTION OF THE DRAWINGS

In the following the invention is described in detail, referring to the attached drawing, wherein.

DESCRIPTION OF THE PREFERRED EMBODIMENT

Figure 1:
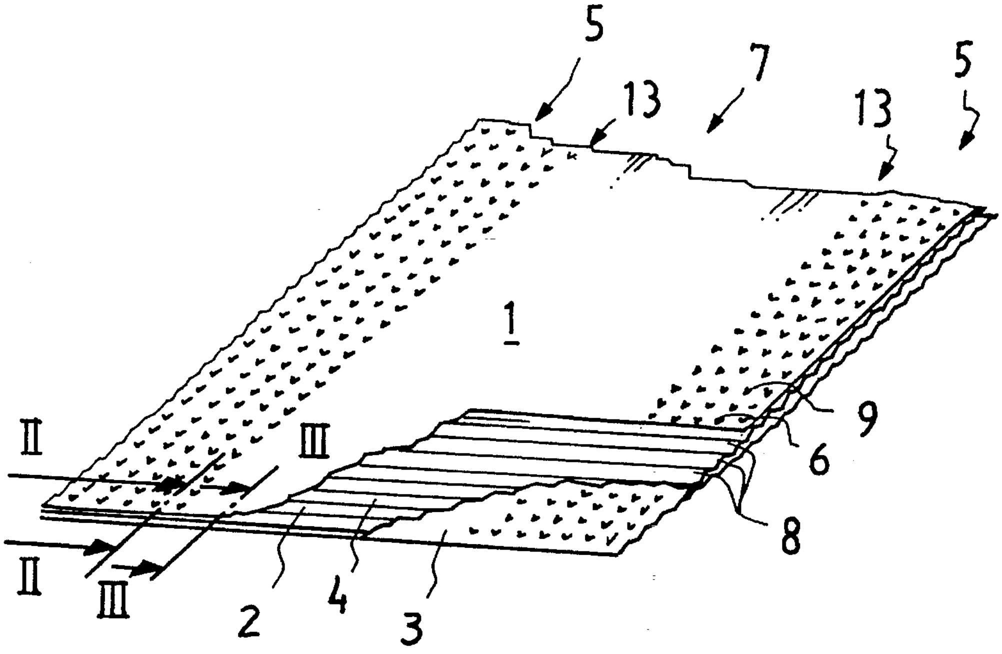
FIG. 1 presents schematically, in perspective, an embodiment of the package padding of the invention.

In FIG. 1 is seen package padding material, which is continuous and web-like or ribbon-like. The package padding has been formed of superimposed paper courses 1, 2 and 3. The package padding comprises a first paper course 1, a second paper courses 2 and a third paper course 3. The first paper course 1 and the third paper course 3 are face layers of the package padding and the second paper course 2 constitutes the middle paper layer. The middle paper layer 2 is embossed over its entire surface area so that it presents a continuous series of consecutive and side-by-side eminences 4, which serve the purpose of giving the package padding a cellular, fluffy padding structure. The middle paper layer 2 moreover comprises a continuous series of accordion-like folds 8 transversal to the longitudinal direction of the web so that the package padding contains, per unit length of the package padding, a greater length of middle paper 2 than of face paper 1 and 2.

Figure 2:
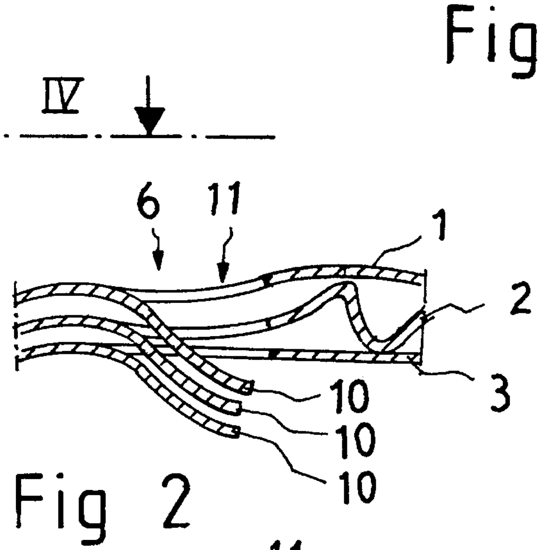
FIG. 2 presents the section II—II of FIG. 1.
Figure 4:
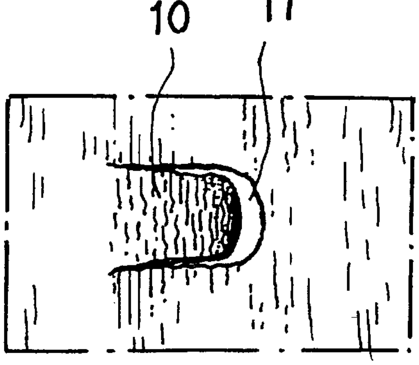
FIG. 4 presents the section IV—IV of FIG. 2.

The package padding has two punch joint regions 5, located on the margins of the package padding web. In the punch joint regions 5, the first paper layer 1 (face paper), the second paper layer 2 (middle paper) and the third paper layer 3 (face paper) have been joined to each other by means of a continuous series of punchings 6, which constitute punch joints as shown in FIGS. 2 and 4 between the papers. In the face paper layer 1 and 3 an embossed pattern 9 has also been formed in connection with the punch joining, which adds to the fluffiness of the punch joint region 5.

The boundary line longitudinal to the package padding web between the intact region 7 and the punch joint region 5 constitutes a handy folding line 13, along which it is easy to fold the package padding longitudinally with reference to the web so that the punch joint regions 5 come to lie upon the intact region 7, whereby the package padding structure becomes a mattress-like, fluffy triple structure, which can for instance be wrapped around the objects which should be protected or, for instance, placed to serve as protective cushions between the wall of the package and the object which should be protected. In order that the package padding might be uniformly soft when folded to be triple, the width of the punch joint regions 5 has been disposed to equal that of the intact region 7 free of punchings.

FIG. 2 shows, in enlarged sectional presentation, all three paper courses 1, 2 and 3 in the punch joint region 5, and the mechanism by which the paper courses are held together. The tongues 10 broken out by pressing with a blunt object (a punching projection) from the topmost paper course 1 and 2 in each instance and joining together the paper layers 1,2,3 at the sites of the punchings 6 have been pressed through the underlying paper courses 2,3 so that the edges of the tongues 10 cling to the edges of the apertures 11 which have been produced in the underlying paper course 2,3.

In a package padding of this type the paper materials of the paper courses 1,2,3 are all of the same kind. Alternatively, the superimposed paper courses may also be different from each other. Advantageously, the package padding is formed of kraft paper courses having a unit area weight on the order of 50 to 100 g/m$^2$. One or the other of the face layers 1 or 3 may also consist of anti-corrosion paper which is intended to inhibit corrosion of objects containing iron. In the eminences 4 of the embossed pattern of the middle paper layer 2 pleats 12 may be formed in order to lend additional rigidity to the eminences 4.

Figure 5:
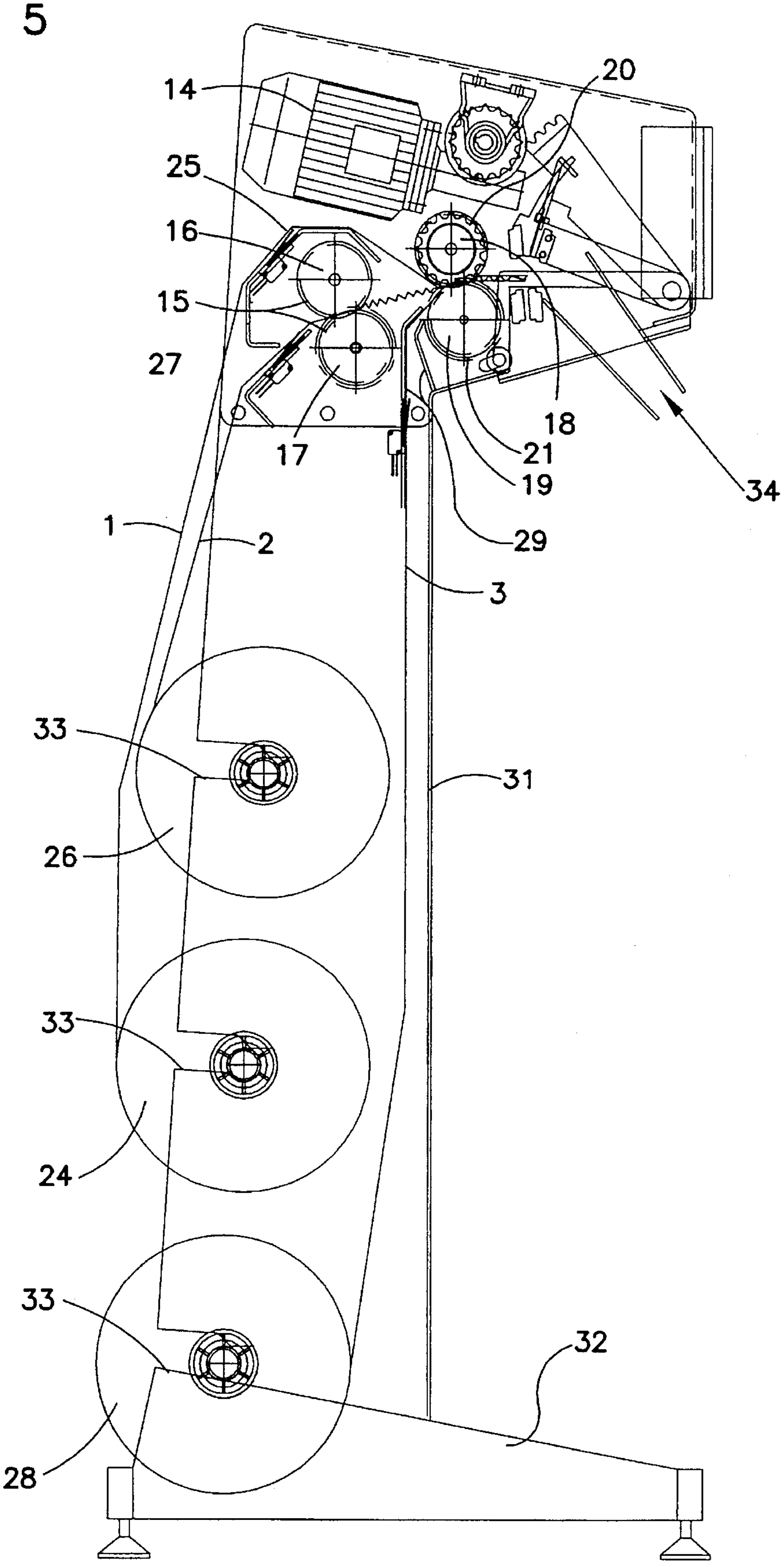
FIG. 5 presents schematically an embodiment of the apparatus of the invention, in elevational view.

FIG. 5 shows an apparatus with which paper padding of the kind described in the foregoing can be produced. The apparatus comprises an upright frame 31, standing firmly in vertical position with the aid of its stand 32 resting on the base. The frame 31 carries in its middle region three supporting members 33 in support of which three separate paper web rolls 26,24,28 can be placed one above the other, as shown in the figure. The package padding web produced with this apparatus will consist, as described in the foregoing, of three courses of paper: two face layers 1 and 3, and a middle layer 2 between these.

The upper part of the apparatus houses the machinery section, of which all components have been assembled within the box-like frame. The machinery section has in its forward part a mouth aperture 34, through which the finished package padding web emerges. Within the housing of the machinery section is provided a power means 14, advantageously an electric motor, which has been arranged to drive the shaping rolls 16,17 cooperating as a pair of roll and counterroll, these rolls being provided with shaping members 15 for embossing the second paper course web 2 conducted to pass through between the rolls.

The apparatus further comprises a pair of punch joint rolls 18,19, cooperating as a pair of roll and counterroll. The punch joint rolls 18,19 are driven by the same electric motor 14 as the shaping rolls 16,17. The punch joint rolls 18,19 are located at a distance from the shaping rolls 16,17 and downstream in the direction of travel of the paper web, relative to the shaping rolls 16,17.

The punch joint rolls 18,19 comprise a first punch joint roll 18, provided with punching members 20, and a second punch joint roll 19, provided with countermembers 21 for the punching members. The punching members 20 and countermembers 21 are arranged in cooperation to produce a continuous series of punchings 6 in the face and middle paper layers 1,2,3 passing through between the punch joint rolls, all paper layers becoming firmly attached to each other by these punchings.

The first paper course web 1 and the third paper course web 3, i.e., the face papers, are guided to run through between the punch joint rolls 18,19 without passing through between the shaping rolls 16,17.

On the punch joint rolls 18,19 have moreover been arranged regions 22,23, respectively, free of punching members and countermembers in order to produce in the package padding an intact region 7 free of punchings (see FIG. 1).

Figure 3:
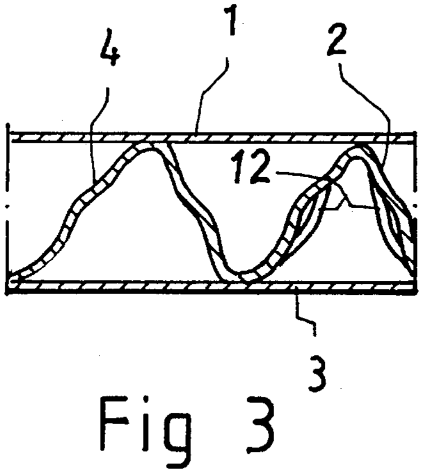
FIG. 3 presents the section III—III of FIG. 1.

The peripheral velocity of the shaping rolls 16,17 has been arranged to be slightly greater than that of the punch joint rolls 18,19, in order that the second paper course web 2, or the middle paper, might become pleated as shown in FIGS. 1 and 3 so that the package padding will contain, per unit length of the package padding, a greater length of middle paper 2 than of face papers 1 and 3.

Figure 6:
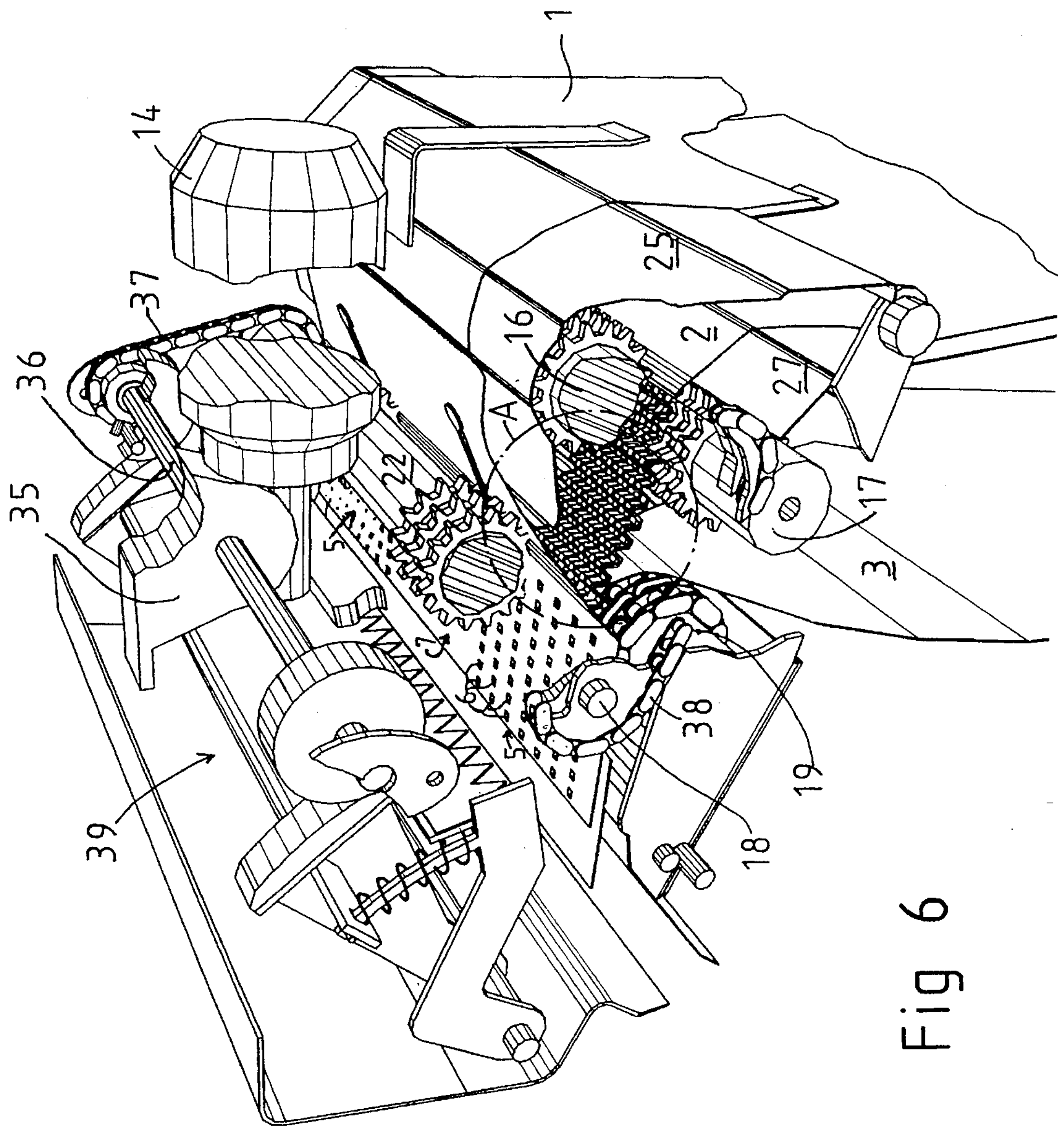
FIG. 6 presents, in perspective, the machinery of the apparatus of FIG. 5, viewed from the rear and obliquely from above, part of the machine elements being sectioned in the interest of clarity.
Figure 7:
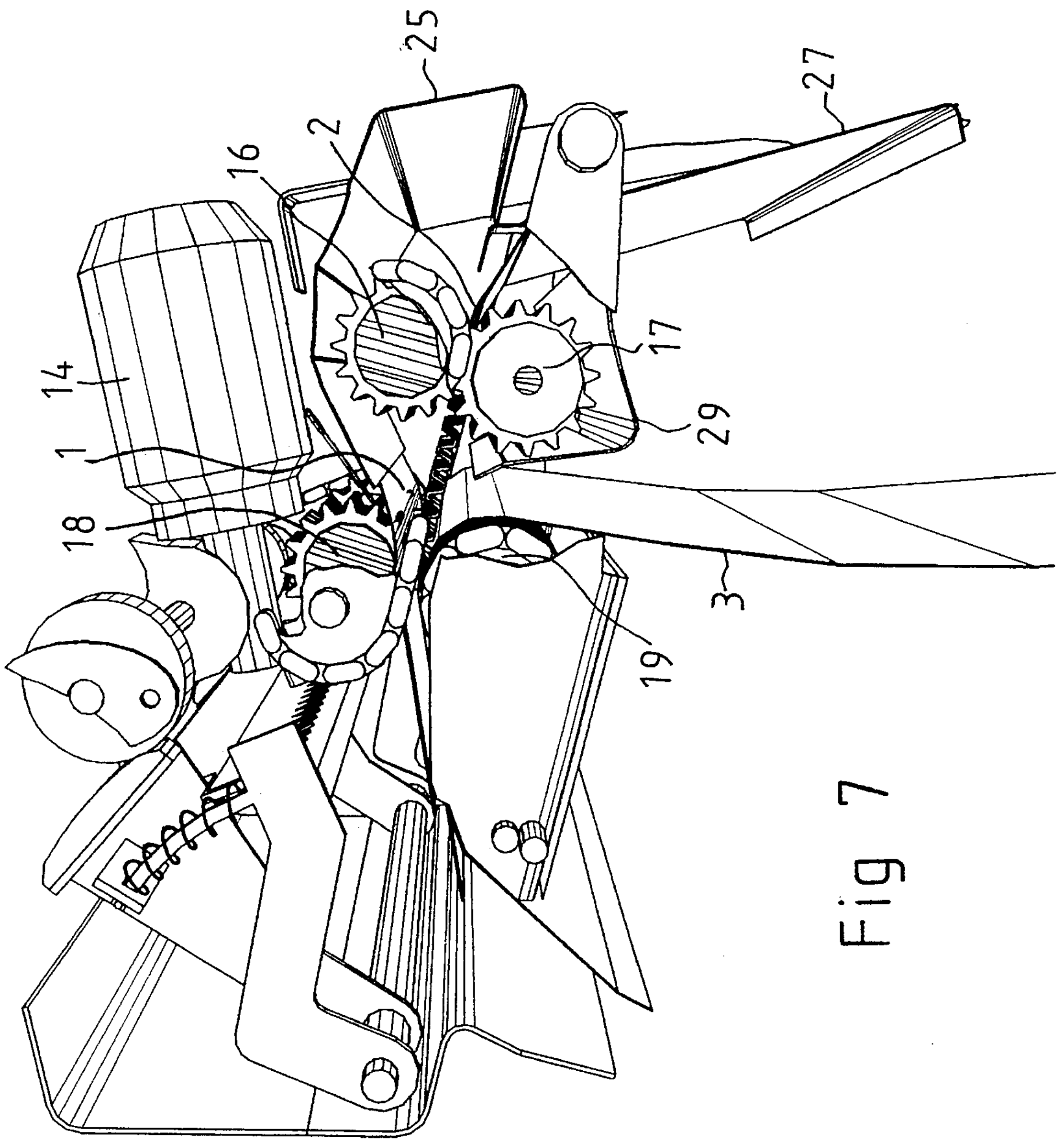
FIG. 7 presents, in perspective, the machinery of the apparatus of FIGS. 5 and 6, seen from one side and slightly obliquely from below, part of the machine elements being sectioned in the interest of clarity.
Figure 8:
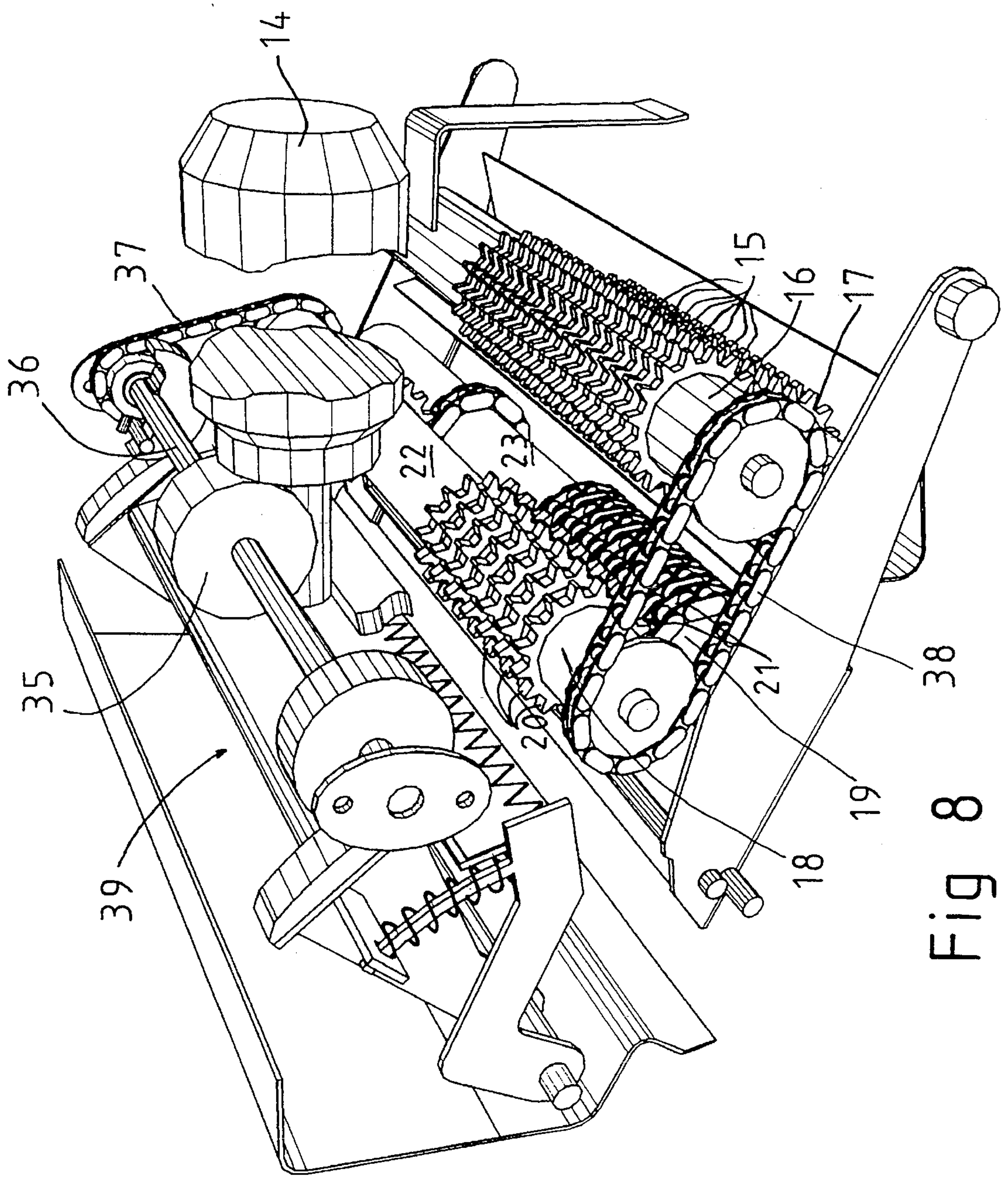
FIG. 8 presents the machinery of FIGS. 5–7, viewed in the same direction as in FIG. 5 but for the sake of clarity without paper webs and without their guide members.
Figure 9:
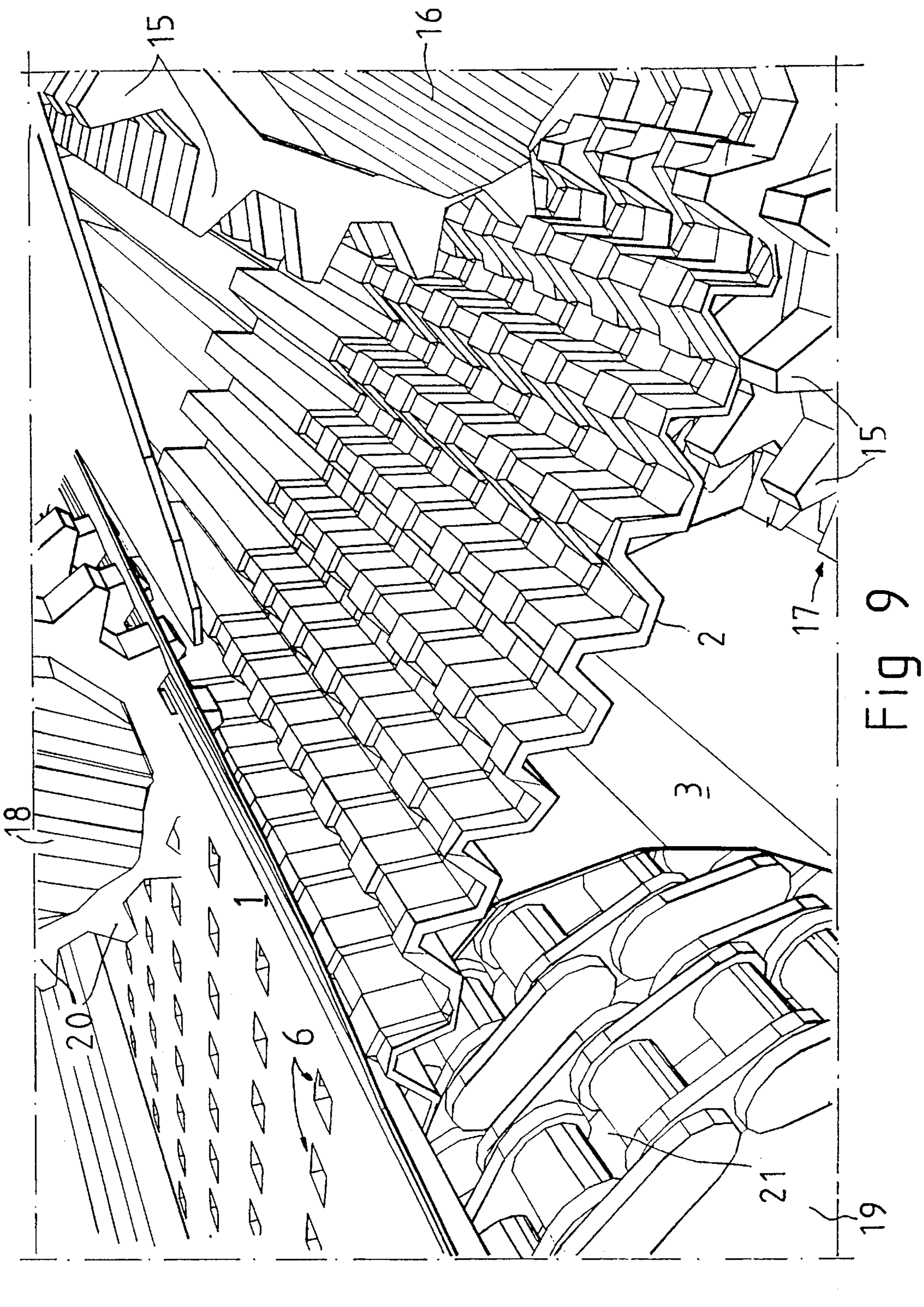
FIG. 9 shows the detail A from FIG. 6.

As FIGS. 6, 7 and 8 reveal, the power transmission system of the apparatus has been arranged so that the driving power is transmitted from the motor 14 over a power transmission line comprising first after the motor 14 an angle gear 15 transmitting the rotation of the shaft of the motor 14 to a transversal principal drive shaft 36. From the principal drive shaft 36, the power is transmitted by means of a first chain drive 37 to the topmost, first punch joint roll 18. From the first punch joint roll 18, the power is transmitted to the lower, second punch joint roll 19 because the punching members and countermembers consist of a chain serration on the roll 18, which is in traction mesh with the sprocket chain wound around the lower roll 19 and affixed thereto, the pin intervals of these chains serving as countermembers. The power is further transmitted by a second chain drive 38 from the other end of the first punch joint roll 18 to the upper shaping roll 16, whence the power is further transmitted to the lower shaping roll by mediation of the interposed middle paper web, as will be apparent later on in connection with FIGS. 10–12. The higher peripheral velocity of the shaping rolls relative to the punch joint rolls, causing pleating of the middle paper 2, can be achieved with ease by appropriate selection of the transmission ratio, or the number of teeth on the sprocket wheels, of the second chain drive.

As regards the power transmission described in the foregoing and the cross-cutting device 39 for the package padding web, visible in the figures and which is operated by the same motor 14 as the rolls 16,17,18,19, reference is here also made to the same applicant's copending Finnish patent application filed on the same date as the present application and having the title "Apparatus for forming package padding".

The first paper roll 24 visible in FIG. 5, which is the centremost of the three paper rolls, contains a supply of the first paper web for the first paper course 1 of the package padding, or for its face paper (see also FIGS. 6 and 7). For guiding the first paper web 1, the apparatus comprises a guide member 25, such as an angulated metal sheet, by means of which the web is guided to go to the punch joint rolls 18,19.

The second paper roll 26 which is located topmost of the three paper rolls, contains a supply of the second paper web for the second paper course 2 of the package padding, or for the middle paper. The apparatus comprises for it a second guide member 27, such as an angulated metal sheet, by which the web is guided to go to the shaping rolls 16,17.

The third paper roll 28 contains a supply of the third paper web for the third paper course 3 of the package padding, or for the second face paper 3. For the third web 3, the apparatus comprises a third guide member 29, such as an angulated metal sheet, for guiding the third paper web to go to the punch joint rolls 18,19 upon the second paper web 2, or the middle paper, on the opposite side relative to the first paper web 1 so that the second paper web 2 will be the middle layer between the first paper web layer 1 and the third paper web layer 3.

As FIGS. 5–7 and 9 reveal, the middle paper web 2 is the only one to pass first through between the shaping rolls 16,17 and thereafter between the punch joint rolls 18,19, and the face paper webs 1 and 3 are both guided to by-pass the shaping rolls 16,17, above and below them, to go directly in between the punch joint rolls 16 together with the middle paper web 2. As they pass through between the punch joint rolls 18,19, all three paper layers become attached to each other with punch joints as depicted in FIGS. 2 and 3.

As can be seen in FIGS. 6–8, the punching members 20 and countermembers 21 have been disposed in the region of both ends of the punch joint rolls 18,19 for producing punch joints 6 so that on the margins of the package padding are formed punch joint regions 5 as seen in FIG. 1. In order that an intact region 7 free of punchings might be left in the centre of the package padding in the area between two punch joint regions 5, the regions 22,23 free of punching members and countermembers are located in the central region of the punch joint rolls 18,19.

The punching members 20 are punching projections or equivalent disposed on the periphery of the first punch joint roll 18, and the countermembers 21 are depressions or equivalent disposed on the periphery of the second punch Joint roll 19. The projections 20 and depressions 21 are arranged to be in register so that each depression is arranged to receive in itself one projection 21. The projections 21 of the punching members 20 are here teeth, which constitute a sprocket wheel-like serration on the periphery of the first punch joint roll 18. The countermembers 21 have been formed of sprocket chains, such as pin chains, sleeve chains, etc., which have been wound to form endless loops around the second punch joint roll 19 and affixed thereto.

Figure 10:
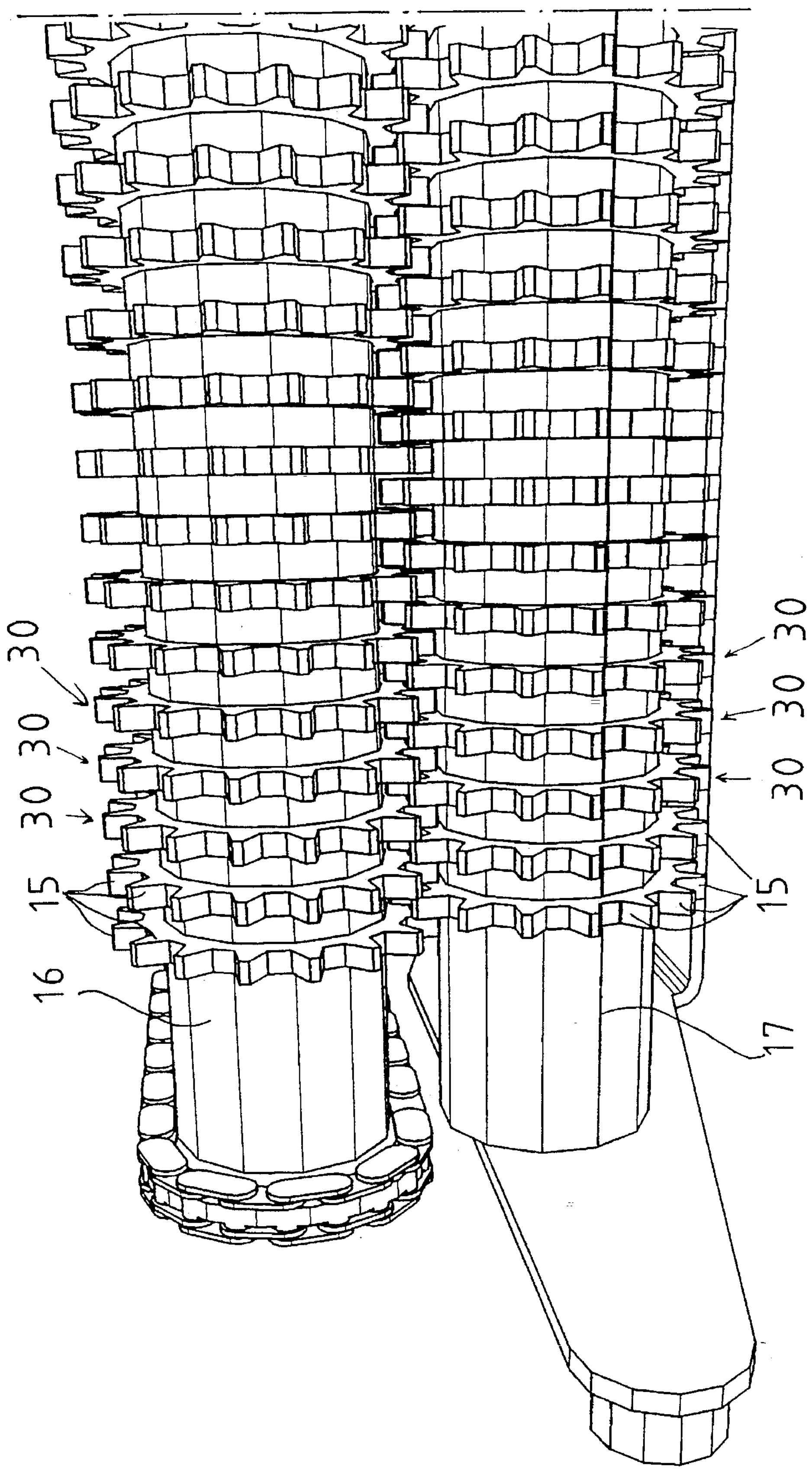
FIG. 10 presents, in perspective, part of the shaping rolls, viewed from the rear.
Figure 12:
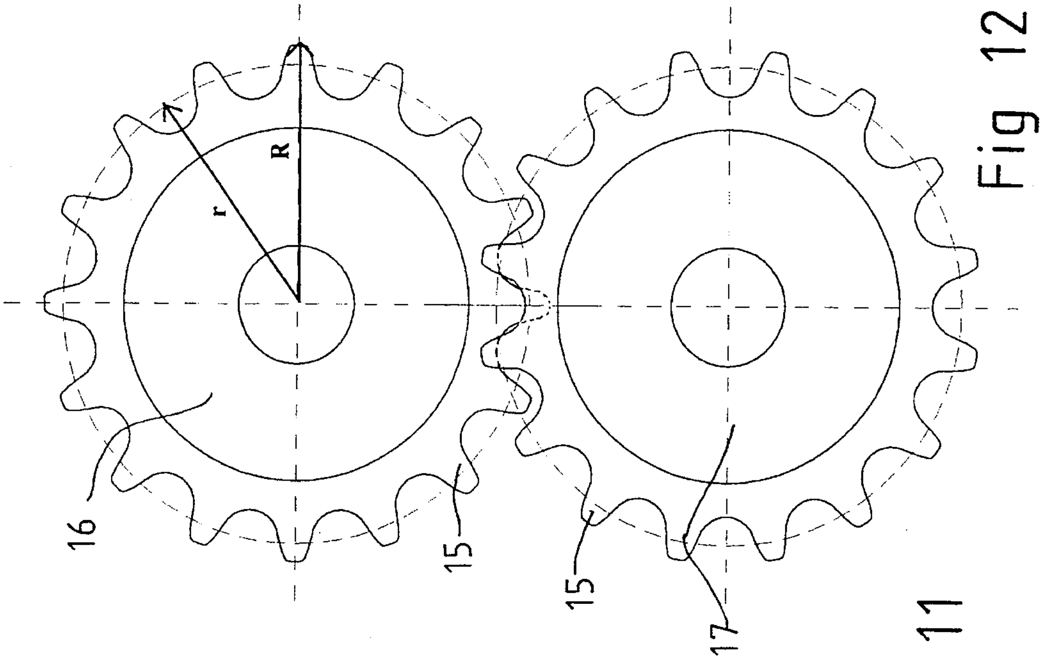
FIG. 12 shows the section XII—XII of FIG. 11.
Figure 11:
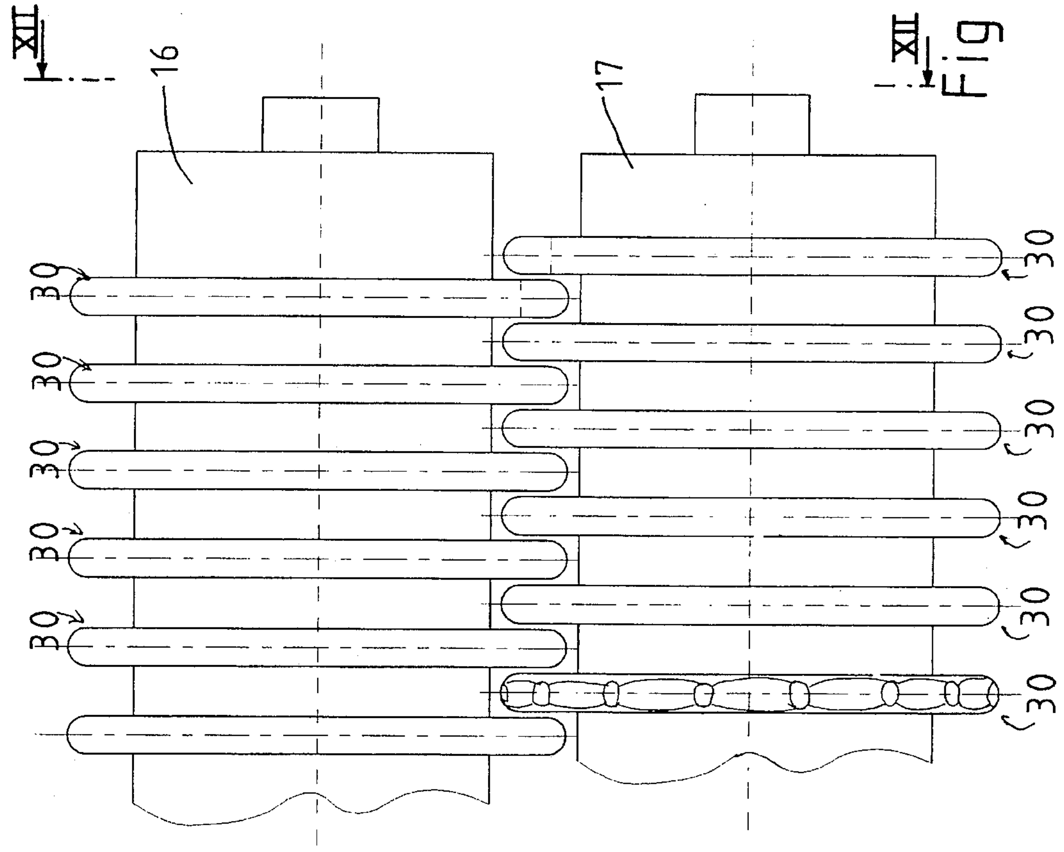
FIG. 11 presents schematically in axonometric projection part of the shaping rolls.

FIGS. 10–12 reveal the more detailed design of the shaping rolls 16,17. The shaping members 15 are shaping projections, disposed radially on the periphery of both shaping rolls 16,17 to constitute a plurality of gear-like or sprocket wheel-like groups of projections 30. The groups of projections 30 are disposed with regular spacing successively over the entire length of the shaping rolls 16,17.

As can be seen in FIGS. 10 and 11, the groups of projections 30 have been disposed on the opposed shaping rolls 16,17 to be intercalated with each other so that they do not touch each other at all. The distance between the shaping rolls 16,17 and adjacent groups of projections 30 is at every point substantially greater than the thickness of the individual paper web. The radial dimensions of the shaping members 15 have been selected so that in the middle paper web 2 are formed by permanent deformation, eminences 4, pleats, distensions, etc., so that the middle paper web 2 will not suffer breakage and that it will well retain its embossed configuration.

The invention is not exclusively delimited to concern the embodiment examples presented in the foregoing: numerous modifications are feasible within the scope of the inventive idea defined by the claims.

I claim:

1. A package padding which is continuous and web-shaped and formed of a plurality of superimposed paper courses, and comprising a first paper course and a second paper course, and at least on the second paper course over a substantial part of an entire surface area of the second paper course being embossed a continuous series of successive and side-by-side eminences to give the package padding a cellular padding structure, the package padding comprising:

a first region, on an area of which the first paper course and second paper course are joined to each other by means of a first continuous series of punchings, which produce a plurality of punch joints; and a second region substantially free of punchings, the package padding being more bulky and fluffy in an area of the second region than the area of the first region, the second region being disposed on one side of the first region;

the second paper course comprising a continuous series of successive pleats transversal in relation to a longitudinal direction of the package padding, the package padding containing per unit length a greater length of a paper material of the second paper course than of a paper material of the first paper course.

2. Package padding according to claim 1, wherein the package padding comprises a third paper course which is of substantially similar kind as the first paper course, the first, second, and third paper courses are arranged to be mutually superimposed, the first paper course and the third paper course are face layers of the package padding, and the second paper course is a paper layer between the face layers, and the first, second and third paper courses are joined to each other by the first series of punchings.

3. Package padding according to claim 1, wherein the package padding comprises a third region, on an area of which the first paper course and second paper course are joined to each other by means of a second continuous series of punchings, which produce a plurality of punch joints, the third region is disposed on margins of the package padding, and the second region is disposed between the first and third regions.

4. Package padding according to claim 1, wherein the first and/or third paper course comprises an embossed pattern which is located in the first and third regions.

5. Package padding according to claim 1, wherein a tongue broken out by pressure from one of the first and second paper courses at a site of the first and second series of punchings joining the first, second, and third paper courses together in the first and third regions is pressed through the second and third paper courses in a manner that an edge of the tongue clings to edges of an aperture which is formed in second and third paper courses of another package padding.

6. Package padding according to claim 1, wherein the paper materials of the first, second, and third paper courses are mutually similar, or alternatively different.

7. Package padding according to claim 1, wherein at least one of the first, second, and third paper courses of the package padding is a kraft paper course having a weight per unit area on an order of 50 to 100 g/m$^2$.

8. Package padding according to claim 1, wherein at least one of the first, second, and third paper courses of the package padding is a paper course which is made of anticorrosion paper.

9. Package padding according to claim 1, wherein the eminences of the embossed area of the second paper course comprise pleats for rendering the eminences more rigid.

10. Package padding according to claim 1, wherein a longitudinal boundary line in the package padding between the second region and the first and third regions constitutes a folding line for folding the package padding along said folding line.

11. An apparatus for forming a package padding according to claim 1, said apparatus comprising a power means and a pair of cooperating shaping rolls provided with a plurality of shaping members and operating as a roll and counterroll pair, at least one of them being driven by said power means and the second paper course being conducted through between them for embossing, wherein the apparatus comprises a pair of cooperating punch joint rolls operating as a roll and counterroll pair and which are disposed at a distance from the shaping rolls and downstream in a direction of travel of paper web relative to the shaping rolls, and said punch joint rolls comprising a first punch joint roll provided with punching members and a second punch joint roll provided with countermembers for punching members, said punching members and countermembers being arranged in mutual cooperation to produce in the first and second paper courses passing through between the punch joint rolls a continuous series of punchings for joining the paper courses to each other, the first paper course web is guided only through between the punch joint rolls without passing through between the shaping rolls and on the punch joint rolls regions, respectively, free of punching members and countermembers have been arranged in order to produce a second region free of punchings in the package padding, a peripheral velocity of the shaping rolls is higher than a peripheral velocity of the punch joint rolls in order to pleat the second paper course, the package padding contains per unit length of the package padding a greater length of the second paper course than of the first paper course.

12. Apparatus according to claim 11, wherein the apparatus comprises a first paper roll with a supply of first paper web for the first paper course of the package padding and a first guide member for guiding the first paper web from the first paper roll to the punch joint rolls, a second paper roll with a supply of second paper web for the second paper course of the package padding and a second guide member for guiding the second paper web from the second paper roll to the shaping rolls.

13. Apparatus according to claim 11, wherein the apparatus comprises a third paper roll with a supply of third paper web for the third paper course of the package padding and a third guide member for guiding the third paper web from the third paper roll to tile punch joint rolls upon the second paper web on an opposite side in relation to the first paper web in such manner that the second paper web will be a middle layer between the first paper web layer and the third paper web layer.

14. Apparatus according to claim 11, wherein the punching members and countermembers are disposed in a region of both ends of the punch joint rolls in order to form punch joints on margins of the package padding, and there are regions free of punching members and countermembers about a center of the punching joint rolls in order to leave the second region free of punchings in the area between the first and third regions of the package padding.

15. Apparatus according to claim 11, wherein punching members and countermembers are disposed to form an embossed pattern in the first and third regions of the package padding.

16. Apparatus according to claim 11, wherein the punching members are punching projections or equivalent disposed on the periphery of the first punch joint roll and the countermembers are depressions or equivalent disposed on the periphery of the second punch joint roll, the projections and depressions are arranged to be in register, each of the depressions being disposed to receive one of the projections therein.

17. Apparatus according to claim 16, wherein the projections of the punching members are teeth arranged to constitute a sprocket wheel-shaped serration on the periphery of the first punch joint roll, the countermembers are formed of sprocket chains, selecting from a group of pin chains, bush chains, which are wound to constitute endless loops around the second punch joint roll, and affixed thereto.

18. Apparatus according to claim 11, wherein the shaping members are shaping projections disposed radially on the periphery of both shaping rolls to constitute a plurality of gear-shaped or sprocket wheel-shaped groups of projections, which are disposed at a regular spacing successively substantially over a whole length of the shaping roll, said groups of projections on an opposed shaping rolls are disposed intercalatingly with each other and a distance between the shaping rolls is at every point substantially greater than the thickness of one single paper web in order to produce in the paper web permanent deformations including distensions, pleats, without substantially breaking the paper.

* * * * *